(12) United States Patent
Schilling

(10) Patent No.: US 8,162,603 B2
(45) Date of Patent: Apr. 24, 2012

(54) VANE FRAME FOR A TURBOMACHINE AND METHOD OF MINIMIZING WEIGHT THEREOF

(75) Inventor: Jan C. Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 517 days.

(21) Appl. No.: 12/362,689

(22) Filed: Jan. 30, 2009

(65) Prior Publication Data

US 2010/0196147 A1  Aug. 5, 2010

(51) Int. Cl.
*F01D 25/04* (2006.01)
(52) U.S. Cl. .................................................. 415/209.4
(58) Field of Classification Search ............... 415/209.4, 415/209.3, 208.1, 200, 191; 29/889.22; 244/54; 60/39.31
See application file for complete search history.

(56) References Cited

U.S. PATENT DOCUMENTS

| | | |
|---|---|---|
| 5,174,525 A | 12/1992 | Schilling |
| 5,205,513 A | 4/1993 | Schilling |
| 6,343,912 B1 | 2/2002 | Manteiga et al. |
| 6,494,677 B1 * | 12/2002 | Grady .......................... 415/209.4 |
| 6,685,431 B2 * | 2/2004 | Hiskes ......................... 415/209.4 |
| 2006/0113706 A1 * | 6/2006 | Chevin et al. ................. 264/258 |
| 2007/0147991 A1 * | 6/2007 | Dasilva et al. ................ 415/189 |
| 2009/0097963 A1 * | 4/2009 | Evans ........................... 415/116 |

* cited by examiner

*Primary Examiner* — Alexander Gilman
(74) *Attorney, Agent, or Firm* — William Scott Andes; Gary M. Hartman; Domenica N. S. Hartman

(57) ABSTRACT

A vane frame for a turbomachine and a method for minimizing the weight of a vane frame. The vane frame includes an inner shroud made up of a plurality of inner shroud segments, an outer shroud circumscribing the inner shroud and made up of a plurality of outer shroud segments, and guide vanes structurally interconnecting the inner and outer shrouds. The guide vanes include a plurality of first guide vanes between and connecting first pairs of the inner and outer shroud segments, and a plurality of second guide vanes between and connecting second pairs of the inner and outer shroud segments. The first and second guide vanes are formed of different first and second materials, respectively, with the first material having lower strength, modulus, and/or density than the second material. The structural interconnection between the inner and outer shrouds is dominated by the second guide vanes.

20 Claims, 2 Drawing Sheets

VANE FRAME FOR A TURBOMACHINE AND METHOD OF MINIMIZING WEIGHT THEREOF

BACKGROUND OF THE INVENTION

The present invention relates to turbomachinery and vanes for guiding air flow through a turbomachine. More particularly, this invention relates to a fan outlet guide vane frame comprising sectors of outlet guide vanes formed of different materials, in which some of the sectors are load-bearing and others are not.

High-bypass turbofan engines are widely used for high performance aircraft that operate at subsonic speeds. As schematically represented in FIG. 1, a high-bypass turbofan engine 10 includes a large fan 12 placed at the front of the engine 10 to produce greater thrust and reduce specific fuel consumption. The fan 12 serves to compress incoming air 14, a portion of which flows into a core engine (gas turbine) 16 that includes a compressor section 18 containing low and high pressure compressor stages 18A and 18B to further compress the air, a combustion chamber 20 where fuel is mixed with the compressed air and combusted, and a turbine section 22 where a high pressure turbine 22A extracts energy from the combustion gases to drive the high pressure stages 18A of the compressor section 18 and a low pressure turbine 22B extracts energy from the combustion gases to drive the fan 12 and the low pressure stages 18B of the compressor section 18. A larger portion of the air that enters the fan 12 is bypassed to the rear of the engine 10 to generate additional engine thrust. The bypassed air passes through an annular-shaped bypass duct 24 that contains one or more rows of stator vanes, also called outlet guide vanes 28 (OGVs), located immediately aft of the fan 12 and its fan blades 26. The fan blades 26 are circumscribed by a fan casing 32, which in turn is surrounded by the fan cowling or nacelle 34 that defines the inlet duct 36 to the turbofan engine 10 as well as a fan nozzle 38 for the bypassed air exiting the bypass duct 24.

The outlet guide vanes 28 form part of a vane frame 40 that further includes inner and outer shrouds 42 and 44 at the radially inward and outward extents, respectively, of the guide vanes 28. A common construction is to form the vane frame 40 of segments, each comprising one or more vanes 28 connecting a pair of inner and outer shroud segments. The outer shroud 44 (formed by the assembly of the outer shroud segments) is secured to the fan casing 32, while the inner shroud 42 (formed by the assembly of the inner shroud segments) is secured to the core engine 16, and more particularly to an inner frame (not shown) of the core engine 16. The fan nacelle 34 is shown in FIG. 1 as attached to and supported by the core engine 16 through the outlet guide vanes 28. The guide vanes 28 have cambered airfoil shapes to modify the air flow through the bypass duct 24 to promote deswirling of the fan air, thus improving efficiency and reducing engine noise.

Because of its dual functions, the vane frame 40 is an important structural component whose design considerations include aerodynamic criteria as well as the ability to provide sufficient structural support and stiffness to the fan nacelle 34 for maintaining the shape of the inlet duct 36 and adequately transitioning static and dynamic loads to the engine core 16. For these reasons, it is important to select appropriate constructions, materials and assembly methods when manufacturing the vane frame 40 and its individual components, including the guide vanes 28 and inner and outer shrouds 42 and 44 and their connections to the fan casing 32 and core engine 16. Various materials and configurations for outlet guide vanes have been considered. Metallic materials, and particularly aluminum alloys, have been widely used. Composite materials have also been considered, as they offer the advantage of significant weight reduction. However, in order to be reliably capable of supporting the fan nacelle and transitioning fan nacelle loads, outlet guide vanes formed of composite materials have generally required complex attachment geometries and hardware, which increases weight and manufacturing and material costs.

BRIEF DESCRIPTION OF THE INVENTION

The present invention provides a vane frame for a turbomachine and a method for minimizing the weight of a vane frame while maintaining a suitable level of structural strength. The vane frame and method are particularly applicable to fan outlet guide vane frames, in which the guide vanes are formed of different materials and some of the vanes are load-bearing while others are not.

According to a first aspect of the invention, the vane frame includes an inner shroud comprising a plurality of inner shroud segments, an outer shroud circumscribing the inner shroud and comprising a plurality of outer shroud segments, and guide vanes structurally interconnecting the inner and outer shrouds. The guide vanes comprise a plurality of first guide vanes between and connecting first pairs of the inner and outer shroud segments, and a plurality of second guide vanes between and connecting second pairs of the inner and outer shroud segments. The first and second guide vanes are formed of different first and second materials, respectively, with the first material having lower strength and modulus than the second material. The structural interconnection between the inner and outer shrouds is dominated by the second guide vanes.

According to a second aspect of the invention, the above-described construction of a vane frame provides for a method capable of minimizing the weight of the vane frame. Namely, by forming the first and second guide vanes of different first and second materials, respectively, and selecting the first material to have a lower density than the second material, the weight of the vane frame can be minimized by constructing the vane frame to comprise more of the first guide vanes than of the second guide vanes, while the structural interconnection between the inner and outer shrouds is dominated by the second guide vanes.

As evident from the above, a significant advantage of this invention is that, by constructing the vane frame so that most of the load applied to the vane frame is borne by the second guide vanes, the first guide vanes can be formed of lighter-weight and less costly materials, thereby reducing the weight of the vane frame. For example, the first guide vanes can be formed of a composite material, which offers the potential of additional benefits such as the ability to configure the first guide vanes for improved aerodynamic performance. Another advantage is that the first guide vanes can be configured in sectors, in which a relatively large number of guide vanes are between and interconnect a single pair of inner and outer shroud segments, thereby reducing the number of vane frame components, including attachment hardware and seals.

Other aspects and advantages of this invention will be better appreciated from the following detailed description.

DETAILED DESCRIPTION OF THE INVENTION

Figure 1:
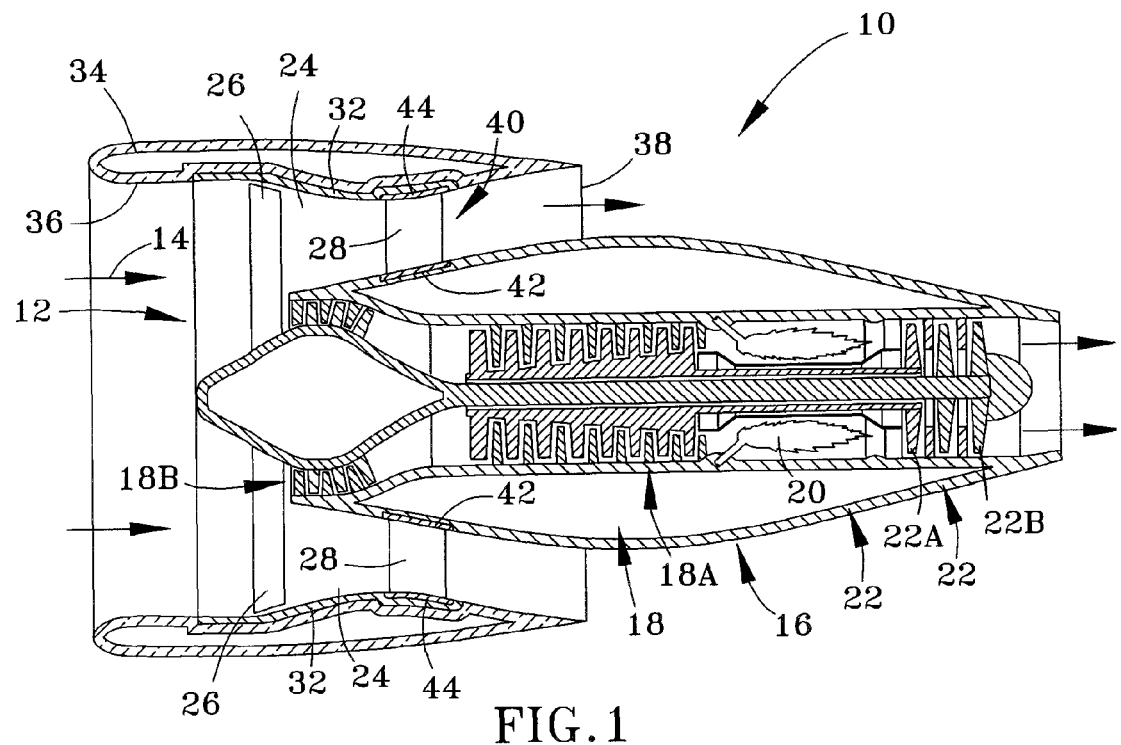
FIG. 1 schematically represents a cross-sectional view of a high-bypass turbofan engine.
Figure 2:
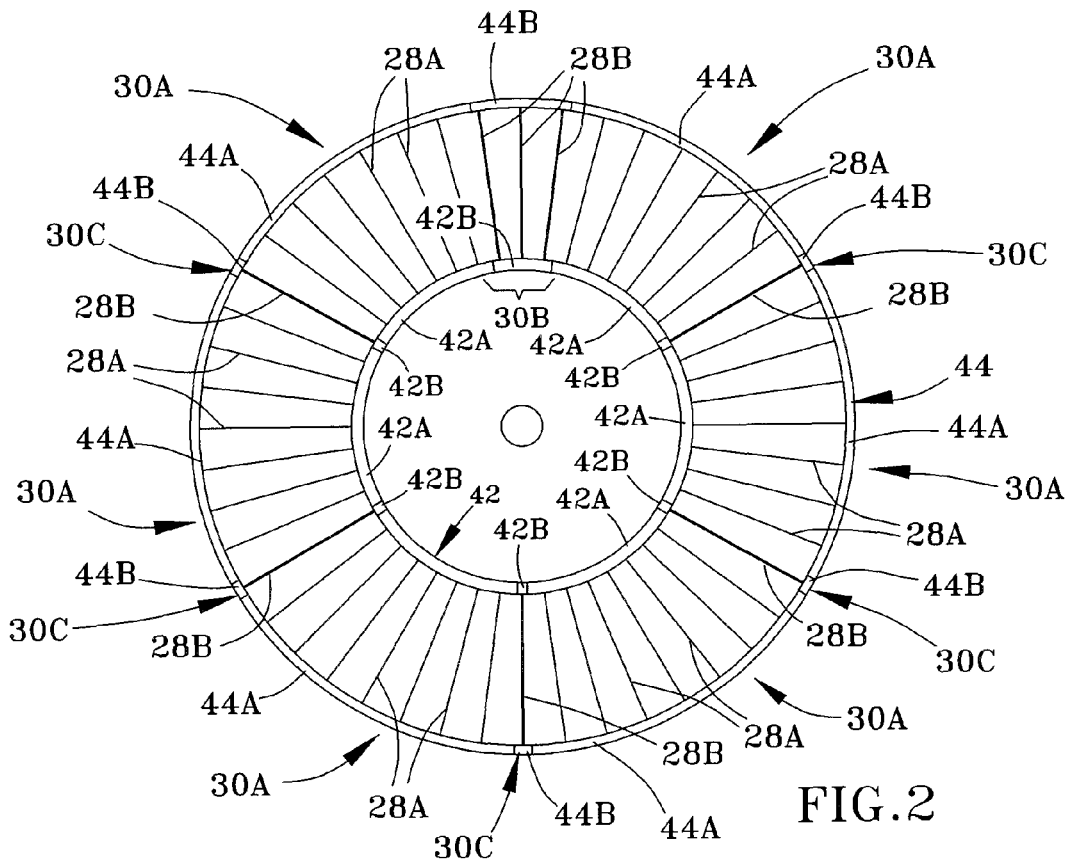
FIG. 2 is a view looking aft at a vane frame of the engine of FIG. 1, and represents the vane frame as comprising sectors of FIG. 3 is an isolated partial side view representing the connection of a type of guide vane sector shown in FIG. 2.

The present invention provides vane frame constructions suitable for use in turbomachinery, and particularly within the bypass duct of a high-bypass turbofan engine, an example of which is the turbofan engine 10 represented in FIG. 1. FIG. 2 is a view looking aft at the vane frame 40 of FIG. 1, and represents the vane frame 40 as comprising fan outlet guide vanes 28 of different constructions (28A and 28B) in accordance with particular aspects of this invention. While the vane frame 40 is represented as having forty-eight guide vanes 28, lesser or greater numbers of vanes 28 are foreseeable.

As discussed in reference to FIG. 1, in addition to the guide vanes 28, the vane frame 40 comprises inner and outer shrouds 42 and 44, respectively, which are adapted to secure the frame 40 to the inner frame of the core engine 16 and the fan casing 32 of the fan nacelle 34. Each of the guide vanes 28A is represented as part of a vane sector 30A in which multiple vanes 28A share a pair of inner and outer shroud segments 42A and 44A. As indicated in FIG. 2, several of the guide vanes 28B located at the top of the frame 40 are also configured as part of a vane sector 30B and share a pair of inner and outer shroud segments 42B and 44B. This sector 30B preferably has multiple vanes 28B to support the higher loads present at the top of the vane frame 40 due to its proximity to the engine forward mount to the wing pylon (not shown). In contrast, each remaining guide vane 28B is shown as an individual airfoil between a pair of inner and outer shroud segments 42B and 44B, yielding a number of single-vane sectors 30C. The vane sectors 30B and 30C are represented in FIG. 2 as approximately equi-angularly interspersed among the guide vanes 28A, with angular spacings of either about 52.5 or about 60 degrees. The top vane sector 30B is represented as having three guide vanes 28B, though it is within the scope of this invention that the sector 30B could contain more or fewer vanes 28B. Similarly, the vane sectors 30A to either side of the top vane sector 30B are represented as having six guide vanes 28A, and the other vane sectors 30A are represented as containing seven guide vanes 28A, though it is within the scope of this invention that these sectors 30A could contain more or fewer vanes 28A. Additionally, though the remaining vane sectors 30C contain a single guide vane 28B, it is foreseeable that any one or more of these vane sectors 30C could contain multiple guide vanes 28B. Finally, it should be understood that the invention is not limited to the particular number, placement and shapes of the guide vanes 28A and 28B and vane sectors 30A, 30B and 30C depicted in FIG. 2.

According to a particular aspect of the invention, while all of the guide vanes 28A and 28B preferably have cambered airfoil shapes to modify the air flow through the bypass duct 24 as discussed previously, the guide vanes 28B are particularly adapted to provide the primary structural support role for the fan nacelle 34, whereas the remaining guide vanes 28A provide less structural support than the guide vanes 28B as a result of being adapted to individually carry lower (if any) loads between the fan nacelle 34 and the engine core 16. Furthermore, the structural interconnection between the inner and outer shrouds 42 and 44 is preferably dominated by the guide vanes 28B, meaning that of the total structural load carried by the guide vanes 28A and 28B, and particularly loads transmitted from the fan nacelle 34 through the vane frame 40 to the core engine 16, is primarily transmitted by the guide vanes 28B. For example, more than 75% and preferably the entire total load imposed by the fan nacelle 34 is carried by the guide vanes 28B, with any remaining load possibly though not necessarily being borne by the guide vanes 28A.

The "structural" guide vanes 28B account for only eight of the forty-eight guide vanes 28 shown for the vane frame 40 of FIG. 2. Consequently, the structural guide vanes 28B are formed of a material with higher strength and modulus than the material from which the "nonstructural" guide vanes 28A are formed. In turn, the material for the guide vanes 28A can have a lower density than the material for the structural guide vanes 28B. Particular but nonlimiting examples include metallic materials for the guide vanes 28B and their inner and outer shroud segments 42B and 44B, and composite materials for the guide vanes 28A and their inner and outer shroud segments 42A and 44A. Titanium alloys are believed to be particularly suitable materials for the guide vanes 28B and the inner and outer shroud segments 42B and 44B, which may be formed by conventional fabrication methods to yield one-piece sectors 30B and 30C. Suitable composite materials for the guide vanes 28A and inner and outer shroud segments 42A and 44A include carbon and glass laminate or chopped fiber reinforcement materials in thermoset or thermoplastic matrix materials, and hollow, sandwich or syntactic foam-filled materials. The sectors 30A formed by the guide vanes 28A and inner and outer shroud segments 42A and 44A can be formed by conventional methods, including resin transfer molding (RTM), compression molding, and injection molding each sector 30A as a unitary molded component.

In view of the materials noted above, the vane sectors 30A and particularly their guide vanes 28A can be considerably lighter and less expensive to manufacture than the vane sectors 30B and 30C and their guide vanes 28B. It is believed that the vane frame 40 of sufficient strength can be achieved in which the structural guide vanes 28B account for not more than about twenty-five percent of the guide vanes 28 (not more than twelve of the forty-eight vanes 28 in FIG. 2), suggesting that the use of composite materials for the non-structural guide vanes 28A offer a significant potential for weight and cost savings. A minimal count for the guide vanes 28B, for example, six of the forty-eight vanes 28 in FIG. 2, is believed to be achieved by limiting the placement of the vanes 28B to roughly 180 degrees apart, for example, at the twelve and six o'clock positions if the turbofan engine 10 is mounted underwing.

Figure 3:
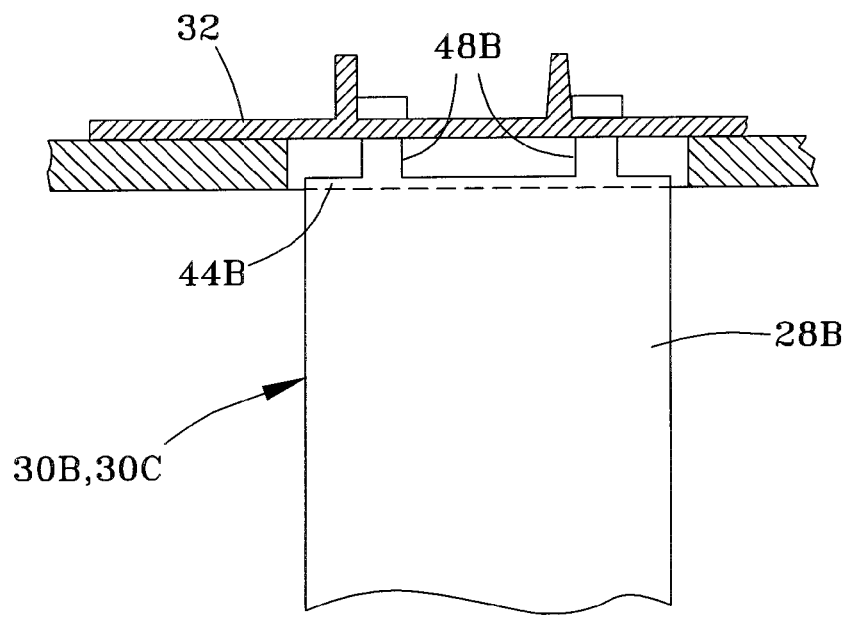

FIG. 3 represents the radially outer end of one of the guide vanes 28B, including its outer shroud segment 44B, and a manner in which the outer shroud segment 44B may be attached to the fan casing 32. Embossments 48B are shown that extend radially outward from the outer shroud segment 44B to engage the fan casing 32, and attachment can be made with any suitable fastening technique. Similar methods of attachment can be provided at the joint between the inner shroud segment 42B and the inner frame of the engine core 16.

Figure 4:
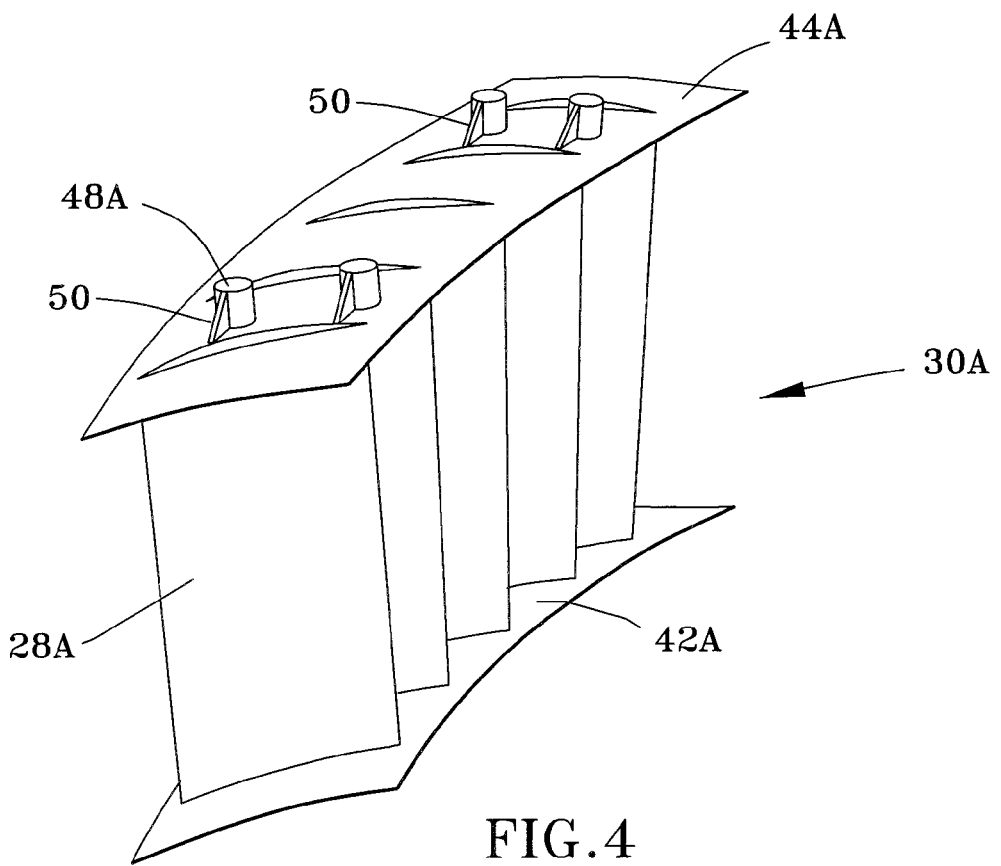
FIG. 4 is an isolated perspective view representing another type of guide vane sector shown in FIG. 2.

FIG. 4 represents a guide vane sector 30A that contains five guide vanes 28A sharing a pair of inner and outer shroud segments 42A and 44A. Similar to the outer shroud segment 44B of FIG. 3, the outer shroud segment 44A in FIG. 4 is equipped with embossments 48A for attachment of the sector 30A to the fan casing 32. Because the outer shroud segment 44A may be formed of a material having lower strength and modulus than the outer shroud segment 44B of FIG. 3, the embossments 48A are shown to be further equipped with tapered ribs 50 for additional rigidity and support. As with the vane sector 30B/30C of FIG. 3, attachment of the outer shroud segment 44A can be made with any suitable fastening technique. In contrast, the inner shroud segment 42A in FIG. 4 is not represented as being adapted for attachment to the inner frame of the engine core. This structural connection can be omitted or at least less robust than the connections for the vane sectors 30B and 30C because the primary structural connection between the fan nacelle 34 and engine core 16 is through the guide vanes 28B instead of the guide vanes 28A. Optionally, some form of attachment can be employed to connect the inner shroud segment 42A to the engine core 16 to better secure and immobilize the vane sectors 30A, and optionally carry part of the aerodynamic load of the sector 30A.

In addition to weight and cost benefits, another potential advantage of the invention is that, with higher numbers of guide vanes 28A in each vane sector 30A, the number of separate components required to construct the vane frame 40 is reduced, as are the number of attachment hardware and seals between adjacent shroud segments 42A, 42B, 44A and 44B, providing the potential for additional savings in weight and cost. Finally, aerodynamic benefits may be achieved as a result of fewer inner and outer shroud segments 42A, 42B, 44A and 44B being required to define the inner and outer flow paths of the vane frame 40 (as defined by the radially outward and inward faces of the inner and outer shrouds 42 and 44, respectively). To further exploit this benefit, the outer shroud segments 44A of the vane sectors 30A can be configured to overlap the outer shroud segments 44B of the vane sectors 30B and 30C to further reduce the number of locations where flow path seals are required.

Because the configurations of the guide vanes 28A are not restricted by structural considerations and the vanes 28A can be produced of molded composite compounds, the shapes of the vanes 28A can be readily contoured to promote desirable aerodynamic effects. For example, the guide vanes 28A of any sector 30A can be fabricated to have greater or lesser vane camber differences than other vanes 28A of the same sector 30A and/or of other sectors 30A-C. For example, any one or more of the sectors 30A can be fabricated to contain guide vanes 28A having different cambers. As a nonlimiting example, any of the sectors 30A can be produced with camber changes of about +1 to about +5 degrees between adjacent vanes 28A within the sector 30A. Furthermore, sectors 30A can be produced to have vanes 28A with increasing or decreasing cambers from one end of the sector 30A to the other. This capability of fabricating sectors to have vanes 28A of different cambers is especially desirable for improving the transition of air flow around the upper and lower bifurcations where, respectively, the engine pylon (not shown) enters the bypass duct 24 for attachment to the forward engine mount (not shown) of the engine core 16, and drain lines (not shown) leaving the engine core 16 pass through the bypass duct 24.

While the invention has been described in terms of specific embodiments, other forms could be adopted by one skilled in the art. For example, the physical configuration of the turbofan engine 10, vane frame 40, and vane sectors 30A, 30B and 30C could differ from those shown, and materials and processes other than those noted could be used. Therefore, the scope of the invention is to be limited only by the following claims.

The invention claimed is:

1. A vane frame for a turbomachine, the vane frame comprising:
   an inner shroud comprising a plurality of inner shroud segments;
   an outer shroud circumscribing the inner shroud and comprising a plurality of outer shroud segments; and
   guide vanes structurally interconnecting the inner and outer shrouds, the guide vanes comprising a plurality of first guide vanes between and connecting first pairs of the inner and outer shroud segments, and a plurality of second guide vanes between and connecting second pairs of the inner and outer shroud segments, the first guide vanes and the first pairs of the inner and outer shroud segments to which they are connected being formed of a first material and the second guide vanes and the second pairs of the inner and outer shroud segments to which they are connected being formed of a second material that is different from the first material, the first material having lower strength and modulus than the second material, and the structural interconnection between the inner and outer shrouds being dominated by the second guide vanes and the second pairs of the inner and outer shroud segments to which they are connected.

2. The vane frame according to claim 1, wherein the first material is a composite material and the first guide vanes and the first pairs of the inner and outer shroud segments are formed as a unitary molded component.

3. The vane frame according to claim 1, wherein the second material of the second guide vanes and the second pairs of the inner and outer shroud segments is a metallic material.

4. The vane frame according to claim 1, wherein the first guide vanes comprise a first group of the first guide vanes that are commonly between and connected to one of the first pairs of the inner and outer shroud segments and define a vane sector therewith.

5. The vane frame according to claim 4, wherein at least some of the first guide vanes of the vane sector have different cambers.

6. The vane frame according to claim 5, wherein the first guide vanes of the vane sector have cambers that differ by about +1 to about +5 degrees between adjacent pairs of the first guide vanes.

7. The vane frame according to claim 5, wherein the first guide vanes of the vane sector have increasing cambers from one end of the vane sector to another end of the vane sector.

8. The vane frame according to claim 1, wherein the first guide vanes comprise multiple groups of the first guide vanes, and each multiple group is commonly between and connected to a corresponding one of the first pairs of the inner and outer shroud segments and define a vane sector therewith.

9. The vane frame according to claim 1, wherein the second guide vanes comprise a first group of the second guide vanes that are commonly between and connected to one of the second pairs of the inner and outer shroud segments and define a vane sector therewith.

10. The vane frame according to claim 1, wherein the second guide vanes comprise at least one individual guide vane that is exclusively between and connected to one of the second pairs of the inner and outer shroud segments and define a vane sector therewith.

11. The vane frame according to claim 1, wherein the second guide vanes are approximately equi-angularly interspersed among the first guide vanes.

12. The vane frame according to claim 1, wherein the second guide vanes account for not more than 25% of all of the guide vanes of the vane frame.

13. The vane frame according to claim 1, wherein the vane frame is installed in a high-bypass duct of the turbomachine and aft of a fan of the turbomachine.

14. The vane frame according to claim 13, wherein the turbomachine comprises a core engine and a fan nacelle, the vane frame structurally interconnects and supports the fan nacelle from the core engine, and at least one of the inner and outer shroud segments comprises embossments that radially extend therefrom and engage and secure the vane frame to at least one of a fan casing of the fan nacelle or an inner frame of the core engine.

15. The vane frame according to claim 14, wherein at least 75% of the load applied to the vane frame by the fan nacelle is transmitted to the core engine by the second guide vanes.

16. The vane frame according to claim 13, wherein the turbomachine is a high-bypass turbofan engine.

17. A method of reducing the weight of a vane frame for a turbomachine, the vane frame comprising an inner shroud comprising a plurality of inner shroud segments, an outer shroud circumscribing the inner shroud and comprising a plurality of outer shroud segments, and guide vanes structurally interconnecting the inner and outer shrouds, the method comprising:

forming a plurality of first guide vanes of the guide vanes that are between and connect first pairs of the inner and outer shroud segments, and forming a plurality of second guide vanes of the guide vanes that are between and connect second pairs of the inner and outer shroud segments, wherein the first guide vanes and the first pairs of the inner and outer shroud segments to which they are connected are formed of a first material and the second guide vanes and the second pairs of the inner and outer shroud segments to which they are connected are formed of a second material that is different from the first material, the first material has a lower density than the second material, the vane frame comprises more of the first guide vanes than of the second guide vanes, and the structural interconnection between the inner and outer shrouds is dominated by the second guide vanes and the second pairs of the inner and outer shroud segments to which they are connected.

18. The method according to claim 17, wherein the first material is a composite material and a first group of the first guide vanes is commonly between and unitarily molded with one of the first pairs of the inner and outer shroud segments to define a unitary molded vane sector.

19. The method according to claim 18, wherein at least some of the first guide vanes of the vane sector are fabricated to have different cambers.

20. The method according to claim 17, further comprising installing the vane frame in a high-bypass duct of the turbomachine and aft of a fan of the turbomachine, wherein the turbomachine comprises a core engine and a fan nacelle and the vane frame is installed to structurally interconnect and support the fan nacelle from the core engine with embossments that radially extend from the inner and outer shroud segments and engage and secure the vane frame to a fan casing of the fan nacelle and an inner frame of the core engine.

* * * * *